(12) United States Patent
Austin (10) Patent No.: US 7,065,517 B1
(45) Date of Patent: Jun. 20, 2006

(54) DATA PROCESSORS

(75) Inventor: James Leonard Austin, Yorkshire (GB)

(73) Assignee: University of York, Yorkshire (GB)

( * ) Notice: Subject to any disclaimer, the term of this patent is extended or adjusted under 35 U.S.C. 154(b) by 374 days.

(21) Appl. No.: 10/019,172

(22) PCT Filed: Jun. 26, 2000

(86) PCT No.: PCT/GB00/02303

§ 371 (c)(1),
(2), (4) Date: Feb. 28, 2002

(87) PCT Pub. No.: WO01/01345

PCT Pub. Date: Jan. 4, 2001

(30) Foreign Application Priority Data

Jun. 26, 1999 (GB) .................................. 9914876.9

(51) Int. Cl.
*G06F 17/30* (2006.01)

(52) U.S. Cl. ............................. 707/3; 707/100; 711/104
(58) Field of Classification Search .................... 707/1, 707/3, 5, 10, 104.1; 702/19; 711/104, 144
See application file for complete search history.

(56) References Cited

U.S. PATENT DOCUMENTS

| | | | |
|---|---|---|---|
| 4,958,377 A | | 9/1990 | Takahashi |
| 6,014,661 A | * | 1/2000 | Ahlberg et al. ................ 707/3 |
| 6,493,637 B1 | * | 12/2002 | Steeg ........................... 702/19 |
| 2003/0191887 A1 | * | 10/2003 | Oates et al. ................ 711/104 |

FOREIGN PATENT DOCUMENTS

EP    0 295 876    12/1988

OTHER PUBLICATIONS

Yang Guoqing et al, "Multilayer Parallel Distributed Pattern Recognition System Model Using Sparse RAM Nets," IEEE Proceedings (Computers and Digital Techniques), Mar. 1992, pp. 144-146.

* cited by examiner

*Primary Examiner*—Jeffrey Gaffin
*Assistant Examiner*—Hassan Mahmoudi
(74) *Attorney, Agent, or Firm*—Smith-Hill and Bedell (57) ABSTRACT

An input device receives sets of input data to be stored in a correlation matrix memory. A sampler derives, from each set of input data, a respective set of tuples, and a coder codes each of the tuples, which are then combined for the respective set of input data. A separator generator generates for each set of input data a respective, associated, unique separator, which is stored with its respective set of input data. For each set of input data, the respective combined coded tuples and the respective unique separator are applied to the correlation matrix memory as a row address and as a column address, or vice-versa.

15 Claims, 5 Drawing Sheets

(a) Character Tokens:
```
S 100000
P 010000
O 001000
T 000100
E 000010
R 000001
```

(b) Tensoring Order: S P O T T E R
with brackets showing pairings 1, 2, 3, 4, 5, 6

(c) Tensor Pattern 1:
'S'  1 0 0 0 0 0
     0 0 0 0 0 0 0
     1 1 0 0 0 0 0
'P'  0 0 0 0 0 0 0     ⟶ 000000100000000000000000000000000000
     0 0 0 0 0 0 0
     0 0 0 0 0 0
     0 0 0 0 0 0

(d) Pattern for 'Spotter':  000000100000010000001100000100000010
(e) Pattern for 'Spoter':   000000100000010000001000000100000010
(f) Pattern for 'Protest':  000010000000000011010000001000010000

FIG. 1

(a) Character Tokens:  S 100000
P 010000
O 001000
T 000100
E 000010
R 000001

(b) Tensoring Order:

(c) Tensor Pattern 1:

```
      'S'
    1 0 0 0 0 0
    0 0 0 0 0 0
    1 1 0 0 0 0
'P' 0 0 0 0 0 0  ──▶  000000100000000000000000000000000000
    0 0 0 0 0 0
    0 0 0 0 0 0
    0 0 0 0 0 0
```

(d) Pattern for 'Spotter':   000000100000010000001100000100000010

(e) Pattern for 'Spoter':    000000100000010000001000000100000010

(f) Pattern for 'Protest':   000010000000000011010000001000010000

| CMM Line | 00010000 | 00000000 | 10000000 |
|---|---|---|---|
| Word Array | 00010000 | 00000000 | 10000000 |

*FIG. 6a*

| CMM Line | 00010000 00000000 10000000 | |
|---|---|---|
| Bit Set Position | 3 | 16 |

*FIG. 6b*

| CMM Width (Bits) | Usage Threshold (Separators) | Pure CMM (Mb) | Compressed CMM (Mb) |
|---|---|---|---|
| 1000 | 31 | 2.38 | 1.61 |
| 2000 | 62 | 4.77 | 1.85 |
| 5000 | 156 | 11.92 | 2.57 |
| 10000 | 312 | 23.84 | 3.76 |

*FIG. 7*

| Width of CMM (bits) | Memory required (Mb) | Total Number of Memories |
|---|---|---|
| 5000 | 305.45 | 553 |
| 10000 | 292.31 | 277 |
| 15000 | 291.38 | 185 |
| 20000 | 292.48 | 139 |
| 25000 | 294.13 | 111 |
| 30000 | 295.63 | 93 |
| 35000 | 297.21 | 79 |
| 40000 | 298.88 | 70 |

*FIG. 8*

| Width of CMM (bits) | Memory Requirement Using Compression (Mb) | Memory Requirement Using Binary CMM (Mb) | Relative Memory Saving |
|---|---|---|---|
| 5000 | 305.45 | 1770.17 | 5.8 |
| 10000 | 292.31 | 2229.29 | 7.6 |
| 15000 | 291.38 | 2498.57 | 8.6 |
| 20000 | 292.48 | 2689.14 | 9.2 |
| 25000 | 294.13 | 2832.08 | 9.6 |
| 30000 | 295.63 | 2945.26 | 10 |
| 35000 | 297.21 | 3036.78 | 10.2 |
| 40000 | 298.88 | 3131.58 | 10.5 |

DATA PROCESSORS

This invention relates to data processors, and is concerned particularly although not exclusively with the matching of and subsequent processing of data.

In known data matching processors, one enters query data to be matched with existing known data. To find a match, the query data is compared with all known existing data until a match is found. This can be a slow process, even with substantial processors.

Thus, a problem with such processors is in achieving data matching and processing at an acceptable speed, with realistic resources. Many known processors organise stored data in fields (as in a database), so that in order to find a stored record, the data in the query must also be organised into fields (e.g. street name, town, postcode, etc.). In many cases, the field names may be unknown. For example, in entering as query data a postal address to be matched, one may not know if a word belongs to a "street" field or a "town" field.

Preferred embodiments of the invention aim to provide data processors that provide rapid matching of query data that can be of much greater length, and which can remove the need for additional identifiers such as field names. In other words, query data can be entered, largely irrespective of order.

According to one aspect of the present invention, there is provided a data processor comprising:
- a) a correlation matrix memory arranged to store data;
- b) input means arranged to receive sets of input data to be stored in the correlation matrix memory;
- c) a sampler arranged to derive, from each set of input data, a respective set of tuples;
- d) a coder arranged to code each of the tuples;
- e) a combiner arranged to combine the coded tuples for a respective set of input data;
- f) a separator generator arranged to generate for each set of input data a respective, associated, unique separator;
- g) storage means arranged to store the association of each separator with its respective set of input data; and
- h) addressing means arranged to applying to the correlation matrix memory, for each set of input data, the respective combined coded tuples as a row address and the respective unique separator as a column address, or vice-versa.

Preferably, the combined coded tuples for each set of input data are in the form of a binary coded word; the data processor further comprises a translator arranged to translate each such binary coded word into a translated word comprising index values representing which bits of the binary coded word are set; and said addressing means is arranged to apply the translated word to the correlation matrix memory.

Preferably, said separator generator is arranged to generate separators in a random manner.

Preferably, said separator generator is arranged to generate separators which are M bits wide and having N bits set, where N>1 or N=1, and where N<M.

Preferably, for each said set of tuples, each tuple comprises three successive elements of a respective set of input data, and each successive tuple is offset by one such element from the preceding tuple.

Preferably, said coder is arranged to code said tuples by tensoring.

Preferably, said combiner is arranged to combine the coded tuples for a respective set of input data, by superimposition.

Preferably, at least some of the rows (or columns) of the correlation matrix memory are represented by binary words, each of which represents the positions of each bit in the respective row (or column) which is set.

Preferably, said correlation matrix memory comprises a plurality of sub-correlation matrix memories; said addressing means is arranged to access a first one of said sub-correlation matrix memories and apply the combined coded tuples of a respective set of input data to that sub-correlation matrix memory unless a respective row (or column) of that sub-correlation matrix memory will become saturated by application of those tuples; and in the event of such prospective saturation, access successive ones of the sub-correlation matrix memories until those tuples can by applied to a respective one of the sub-correlation matrix memories without such saturation.

A data processor according to any of the preceding aspects of the invention may be arranged to receive sets of query data to be matched with sets of input data stored in the correlation matrix memory, and to derive, for each set of query data, a respective set of coded tuples analogous to those derived for the original input data, and to apply to the correlation matrix memory, for each set of query data, the respective combined coded tuples as a row (or column) address: the data processor further comprising:
- i) output means for outputting a raw superimposed separator which represents, for a respective set of query data, the number of rows (or columns) having a bit set by the applied combined coded tuples in each column (or row) represented by the raw superimposed separator;
- j) threshold means arranged to convert the raw superimposed separator into a binary superimposed separator; and
- k) an extractor arranged to extract individual separators from the binary superimposed separator.

Preferably, said thresholding means sets an absolute threshold value, and provides said binary superimposed separator as a word in which bits represent respective columns (or rows) of the correlation matrix memory, and each of those bits is set if the number of rows (or columns) having a bit set by the applied combined coded tuples in the respective column (or row) equals or is greater than said absolute threshold value.

Said thresholding means may determine a value k, and provide said binary superimposed separator as a word in which bits represent respective columns (or rows) of the correlation matrix memory, and are set for the k respective columns (or rows) having the highest number of rows (or columns) which have a bit set by the applied combined coded tuples in the correlation matrix memory.

A data processor as above may further comprise back-checking means arranged to compare sets of recalled data, identified by respective separators extracted by said extractor, with original query data, in order to identify the set or sets of recalled data which matches best the original query data.

A data processor according to any of the preceding aspects of the invention may be arranged to process sets of input data and query data in the form of postal addresses.

According to another aspect of the present invention, there is provided a method of processing data, comprising the steps of:
- a) receiving sets of input data to be stored in a correlation matrix memory;
- b) deriving, from each set of input data, a respective set of tuples;

c) coding each of the tuples;
d) combining the coded tuples for a respective set of input data;
e) generating for each set of input data a respective, associated, unique separator;
f) storing the association of each separator with its respective set of input data; and
g) applying to the correlation matrix memory, for each set of input data, the respective combined coded tuples as a row address and the respective unique separator as a column address, or vice-versa.

According to another aspect of the invention, there is provided a method of processing data comprising the steps of:
a) receiving sets of query data to be matched with sets of input data stored in a correlation matrix memory by a method according to the preceding aspect of the invention;
b) deriving, for each set of query data, a respective set of coded tuples analogous to those derived for the original input data;
c) applying to the correlation matrix memory, for each set of query data, the respective combined coded tuples as a row (or column) address;
d) outputting a raw superimposed separator which represents, for a respective set of query data, the number of rows (or columns) having a bit set by the applied combined coded tuples in each column (or row) represented by the raw superimposed separator;
e) converting the raw superimposed separator into a binary superimposed separator;
f) extracting one or more individual separator from the binary superimposed separator; and
g) identifying the or each respective original set of input data from association with the or each individual separator extracted from the binary superimposed separator.

Any of the above methods may be carried out by a data processor according to any of the preceding aspects of the invention.

Any of the above methods may incorporate any of the features disclosed in this specification, claims and/or drawings.

For a better understanding of the invention, and to show how embodiments of the same may be carried into effect, reference will now be made, by way of example, to the accompanying diagrammatic drawings, in which.

Figure 1:
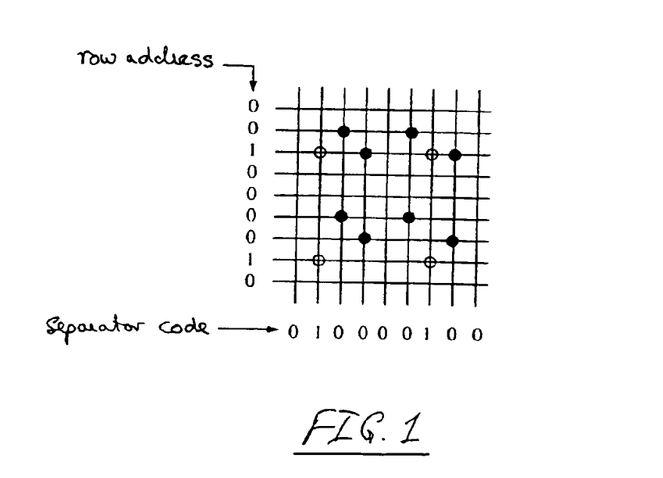
FIG. 1 is an illustration of a correlation matrix memory (referred to herein for convenience as a "CMM")

The basic principle of operation of a correlation matrix memory (CMM) is illustrated in FIG. 1. The CMM is illustrated as having a plurality of rows and columns. The intersection of each row and column in FIG. 1 represents one bit of memory so that, conceptually, the CMM comprises many one-bit cells, each initially set to '0'. During a teaching step, during which data is stored in the CMM, every cell at the intersection of an active row and an active column is set to '1', regardless of its current state. Other cells are left unchanged.

Thus, in FIG. 1, the intersections with a solid dot ● have previously been set to '1', whilst additional intersections with a hollow dot ○ are newly set by the illustrated row address pattern 001000010 and column address pattern 010000100.

To recall data from the CMM of FIG. 1, a row address pattern is applied, and a row is addressed only when a '1' appears in the row address pattern. For each column, a sum is generated of all intersections set at '1' in all rows addressed by the applied row address pattern, and the sum is subsequently processed.

For example, if the row address pattern illustrated in FIG. 1 is applied again as query data to the CMM, in a recall step, then the column sum pattern 020100210 as illustrated would be obtained, as representing the number of intersections set at '1' in each of the columns, for all of the addressed rows. FIG. 1 is a very simple example to illustrate the mode of operation. In practice, one would expect the numbers of intersections set at '1' to be rather higher, for at least some of the columns.

An understanding of the configuration and use of a CMM such as illustrated in FIG. 1 in an embodiment of the invention may be made easier by use of a specific example. Thus, there will now be described an example of storing and retrieving a list of addresses in the CMM. It is to be understood that this is by way of example only, and data of any other type may be stored and retrieved in an analogous manner.

The address data used in this example, which has been the subject of our experimental research, is in a data file containing postal addresses.

The first step is to pre-process the address data file to combine some redundant elements representing small variations in basically the same address, and to remove exact duplications so that each record is unique. The main objective here is to reduce the size of file needed to represent the data, so that smaller CMMs can be used. The current implementation of pre-processing reduces the number of records that must be stored from 26 million in the address data file to just over 4.3 million records.

Even before pre-processing, the address data file already contains some groups of multiple addresses in abbreviated form, stored in a single record. For example, the even or odd-numbered houses in a street may appear as "N-M Argyle Street" (say) in a single record. The procedures described here additionally allow consecutive numbers to be combined into an address range in a single record as well.

Note that multiple passes are normally required, because the procedures are applied recursively. However, several records can be combined in a single pass so that, for example, the eight records covering house numbers 21, 22, 23, 24, 25, 26, 27 and 28 can be combined to produce the new record "21.28 High Street . . . " (for example), if the original records occur successively in the address database.

The following procedures are applied in pre-processing the address data file to obtain an input database file.

If N records are identical, (N-1) of those records are removed.

If a consecutive range of two or more records differs in only one word, and that word is not the postcode, then the records are replaced by a new combined record using the following syntax:

1. Numeric strings (natural numbers) whose value differs by exactly one across a consecutive sequence of (otherwise identical) records are replaced by a new combined string separated by the "." character. Thus, for example, "21 High Street, Jollytown JO5 2TR", "22 High Street, Jollytown JO5 2TR" and "23 High Street, Jollytown JO5 2TR" are replaced by the single record: "21.23 High Street, Jollytown JO5 2TR".

2. Numeric strings (natural numbers) whose value differs by exactly two across a consecutive sequence of (otherwise identical) records are replaced by a new combined string separated by the "-" character. Thus, for example, "21 High Street, Jollytown JO5 2TR", "23 High Street, Jollytown JO5 2TR" and "25 High Street, Jollytown JO5 2TR" are replaced by the single record: "21-25 High Street, Jollytown JO5 2TR"

3. Alphanumeric strings (but not postcode strings) are replaced by a new combined ("folded") record but separated by whitespace, and delimited by ">" and "<" characters. Thus, for example. "Old Farm Cottage, Ditherington, Blistershire BL6 4DI" and "New Farm Cottage, Ditherington, Blistershire BL6 4DI" are replaced by: ">Old New<Farm Cottage, Ditherington, Blistershire BL6 4DI".

All of the above procedures result in compressing the input data.

Lastly, records are transferred to the input database file in a pseudo-random order. The intended purpose of this re-ordering is to reduce the occurrence of clusters of similar text strings, by distributing these more uniformly through the input database. That is, the original address database is supplied in what is called 'Postcode Area Order', where the file is sorted according to the postcode. Addresses which share the same postcode are then sorted according to other fields in the address database such as street name, building name and locality. This means that, for example, the first 3000 or so addresses in the address data file all belong to the AB10 postcode area—somewhere in Aberdeen. All of these records will therefore have a much higher degree of similarity than 3000 addresses taken at random from the database. By taking the records in random order, there will tend to be a much wider variation of data presented to any particular CMM before it begins to get saturated. Saturation of CMMs will be discussed again below.

Figure 2:
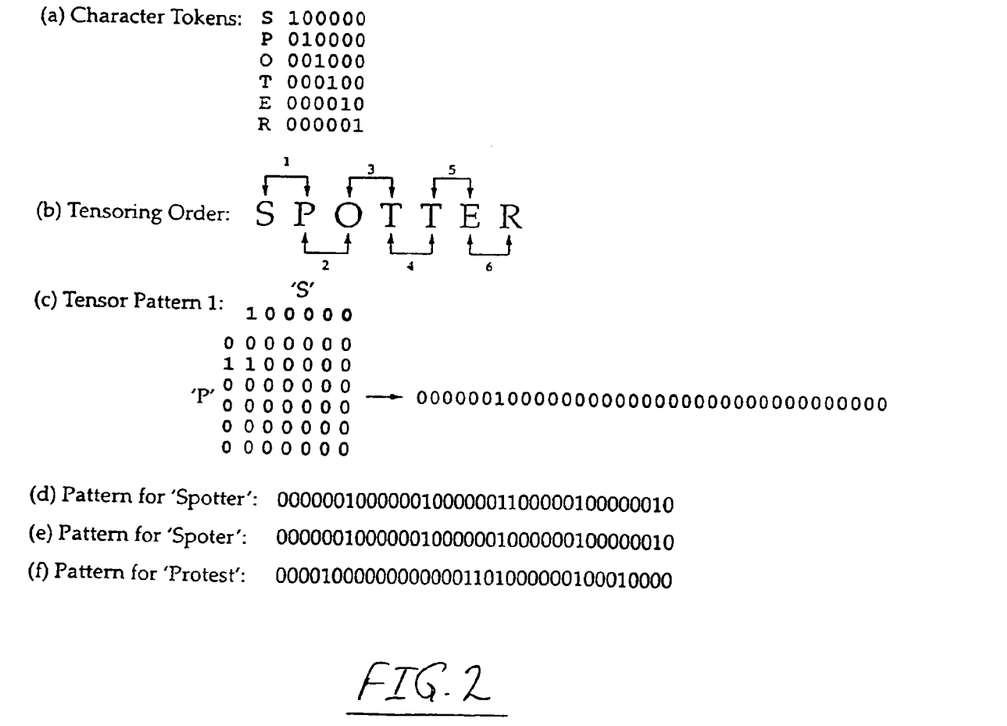
FIG. 2 illustrates tupling, tensoring and coding of a simple input word.

In order to enter data into a CMM for storage, the text of the addresses has to be converted into binary code. In order to do this, each character is assigned a unique binary code. FIG. 2(a) shows an example of this, where six letters are each assigned a respective six-bit binary code, in each of which only a single bit is set to '1'.

The text to be stored is then subjected to n-tuple sampling. By this it is meant that each string of characters is divided into a succession of samples of n characters, each sample being one character on from the previous sample. Another way to look at this is as a "sliding window" n characters wide, which moves across a stream of input characters, such that the "window" advances one character at a time.

This is most readily understood by reference to FIG. 2(b), where the word SPOTTER is sampled (for simplicity) as six 2-tuples, each comprising a successive pair of characters.

A unique binary code is then assigned to each 2-tuple or pair of characters, as the result of combining the binary codes of the individual characters of the pair, using a binary tensor product operation. An example of this is shown in FIG. 2(c), where the tensor product of the first 2-tuple of FIG. 2(b) is formed as the cross product of the two binary values of the letters 'S' and 'P'. The resulting matrix is then converted back into a single binary number simply by taking each row of the matrix in turn and concatenating them together. The order in which the rows are taken is not important, provided that it is consistent for all tensor products. It is important to note that the final single binary number resulting from the tensoring of each 2-tuple depends upon the order of the letters in the tuple—i.e. the result from "PS" is different to that from "SP".

When all of the 2-tuples in the text have been sampled and tensored to produce respective binary numbers (six in this simple example), all of those binary numbers are combined by a binary OR operation to produce a final binary pattern or number for the text. FIG. 2(d) illustrates the final binary pattern or number for the input word "SPOTTER". FIG. 2(e) shows the corresponding final binary pattern or number for the slightly mis-spelt input word "SPOTER". Note the similarity between the binary patterns of FIGS. 2(d) and 2(e).

By contrast, FIG. 2(f) shows the final binary pattern or number for the input word "PROTEST". Note the marked difference between the binary patterns of FIGS. 2(d) and 2(f), even though the word PROTEST is an anagram of the word SPOTTER, and therefore comprises exactly the same characters.

Thus, the final patterns for two words which are anagrams of each other will usually be quite different, whereas a spelling mistake will only affect two tensor patterns (for 2-tuples), so the overall pattern for the word should not be overly disrupted.

Although 2-tupling and tensoring has been illustrated for simplicity, higher order tupling and tensoring can equally well be carried out. We have found 3-tupling and tensoring to be particularly efficient.

The illustrative example of FIG. 2 shows tupling and tensoring of a single word. In the practical example of the address data file, each record (i.e. a complete postal address) is sampled (typically in 3-tuples or "triples") and tensored to give a resultant binary number or pattern for that record. There is then generated for that record (typically using a pseudo-random process) a second binary pattern which we refer to as a separator, which is associated with the binary pattern of the record. The purpose of the separator is to represent the record which may later be found by a search operation, and so a record is maintained of the original data record represented by each separator.

The binary pattern for each record is then entered into the CMM with its respective separator. That is, the binary pattern for the record is applied as a row address and its respective separator as a column address (or vice-versa), and the intersections of the CMM which have both row and column addressed as '1' are set as '1'. This is generally in the manner as described above with reference to FIG. 1.

All desired records are entered into the CMM in this way, which may be referred to as a step of "teaching" the CMM.

Once all of the desired data has been stored in the CMM, records can be recalled from the CMM when desired, by a "recall" or "search" step, as follows.

Firstly it is necessary to enter query data—that is, as much of an original record as is available, to identify the full record. The query data is then processed in the same way as original data was entered in the CMM in the first place—that is, it is sampled in tuples, the tuples are binary coded and tensored, and the tensored products combined to form a final binary pattern of the query data.

Figure 3:
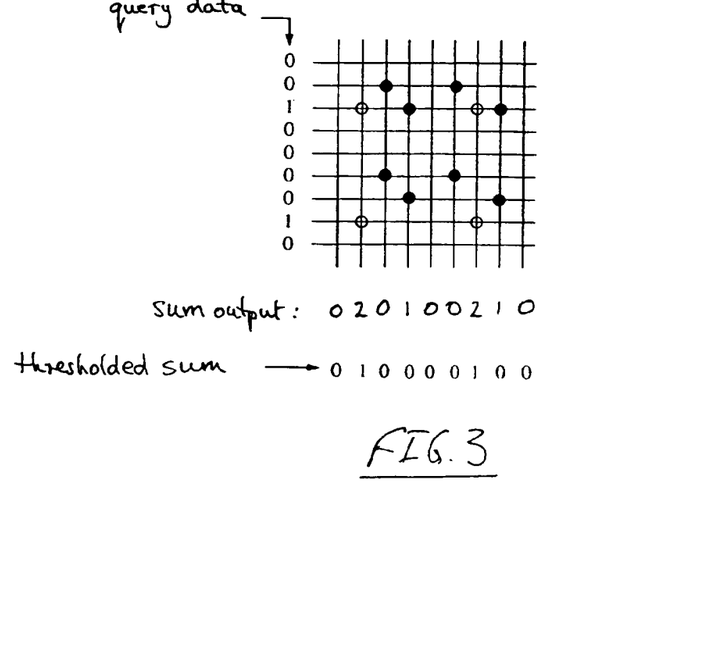
FIG. 3 is an illustration similar to that of FIG. 1, but showing an output array of summed values.

The final binary pattern thus formed is then applied as a row address to the CMM. Then, for each column of the CMM, for each row of the address set to '1', the number of intersections of that row and column which are set to '1' are counted, to give a sum for that column. The sequence of sums for all of the columns gives a 1-dimensional output array of summed values. As a very simple example of this, FIG. 3 shows the CMM of FIG. 1, with the same row address as in FIG. 1 applied, and showing the array of summed values of the columns as 020100210. This represents a number of combined separators that may match the input query represented by the row address applied to the CMM.

To reduce the number of potential "hits" represented by the separators included in the output array of summed values, a thresholding step is applied. For example, referring to FIG. 2, if a threshold value of "2" is applied to the output array of summed values, each bit of the array which is equal to or greater than "2" is set to '1', and all other bits are set to '0'. This then reduces the original output array of summed values to a binary output array. In the simple example of FIG. 3, the binary output array is 01000010. Due to the simplicity of this example, this is identical to the original separator code applied in FIG. 1, which then links to the original record. However, as a general rule, the binary output array will be more complicated, representing a number of superimposed separators, and will require further processing by an extractor to extract the correct separator for the query data and therefore link to the original record that is sought.

It is quite likely that, given incomplete query data, there will be a number of possible matches to the query. In this case, the extractor will extract a number of individual separators, which are then linked to their respective records, which in turn can be listed, preferably in a ranking order.

The above description outlines a data processor as one example of an embodiment of the invention. The essential parts of such a data processor 1 are illustrated diagrammatically in FIG. 4.

Figure 4:
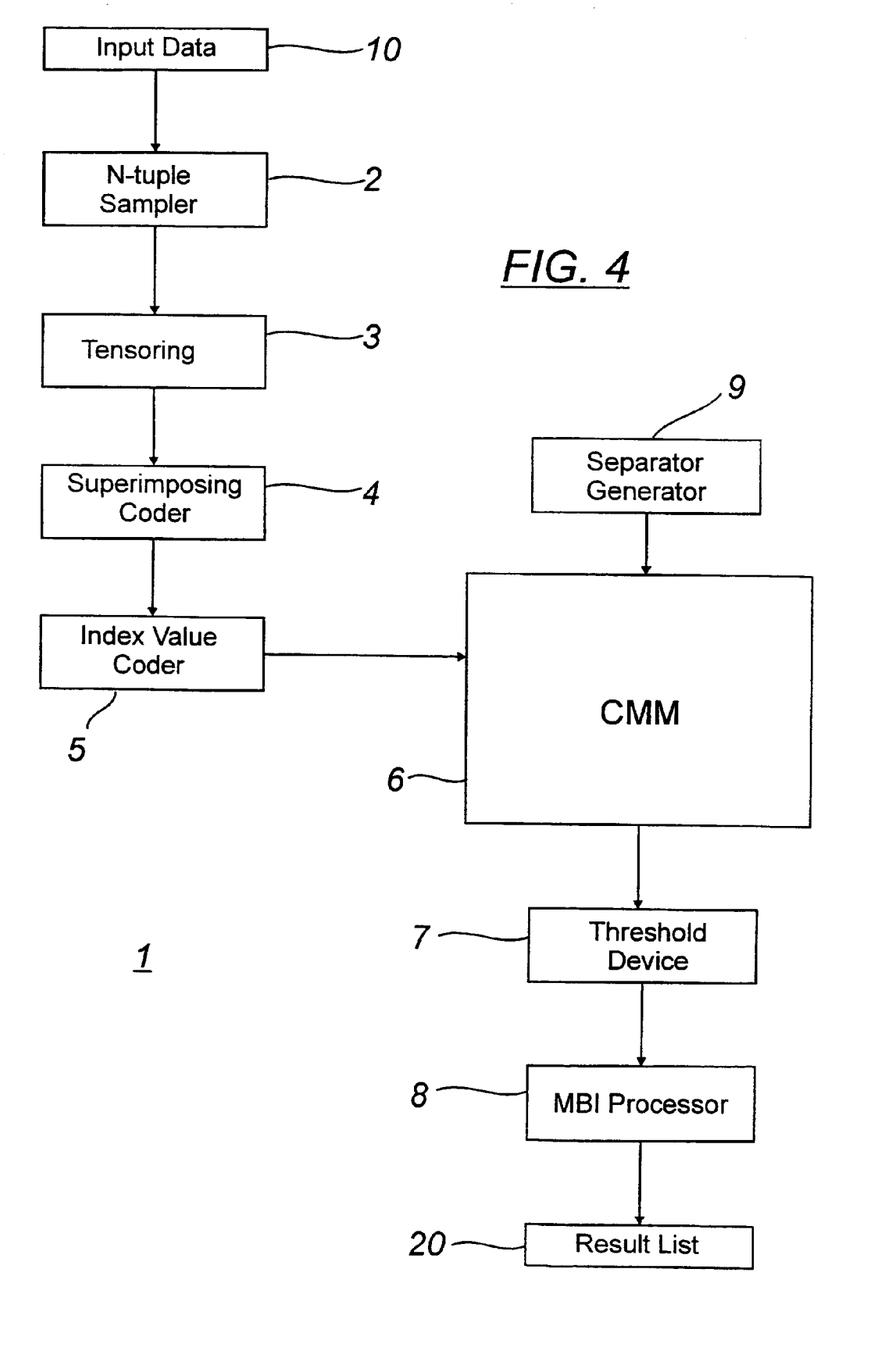
FIG. 4 is a block diagram of a data processor comprising one example of an embodiment of the invention.

In FIG. 4, query data is input at 10, having been subject to pre-processing as outlined above. The data is then passed to a sampler 2, which forms n-tuples. The tuples are then coded. To this end, a tensoring means 3 forms tensor patterns from the binary codes of the letters of the tuples, and the tensor patterns are combined by a superimposing coder 4. The output of the coder 4 is translated by an index-value coder 5, which outputs a series of values representing the positions of each respective bit which is set to '1' in the output of the superimposing coder 4.

The output of the index-value coder 5 is then applied as a row address pattern to the CMM 6, which already has data stored in it. As described above, the CMM outputs a column address pattern, the value of each column representing the number of row intersections with that column, that are set to '1'.

The CMM output is fed to a threshold device 7, which provides an output in binary form, indicating the columns that meet the threshold value. The output is then fed to an MBI processor 8 (an example of which is described below), which extracts all separator codes that match the output of the threshold device 7.

The extracted separators are then matched with their respective input data, to provide a result list 20. This result list 20 can then be subjected to a Back-Check operation (also described below), to match final results more closely with the original query data.

Figure 5:
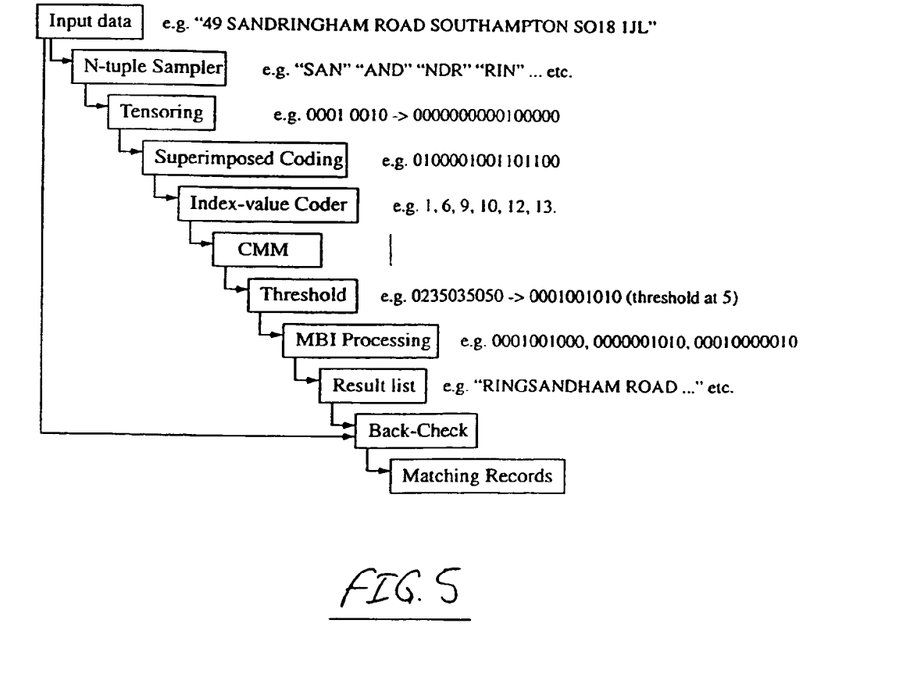
FIG. 5 illustrates an example of steps carried out by the data processor of FIG. 4, to locate data stored in the correlation matrix memory of the data processor.

An example of the above steps is summarised in FIG. 5.

FIG. 4 also shows a separator generator 9, which generates a separator code for each record that is entered into the CMM for storage, as mentioned above. The separator generator 9 generates separator codes each having M bits, and each having the same number N (N>1 and N<M) of the M bits set to '1'. The N set bits of each separator code are randomly chosen (although no two separator codes are allowed to be identical), so that the various separator codes share a minimum number of set bits in common. (In some other applications, two or more separator codes may be allowed to be identical.)

By choosing N to be greater than 1, M can be much less than it would be if N=1, and therefore the size of the respective CMM can be reduced, thus saving space. However, N could be 1 in some applications.

By allowing separator codes to have overlapping bits, a plurality of possible matches to an input query may be obtained. The genuine match can be found from the possible matches by Back-Checking.

An alternative method to extract matches from a CMM query is "k-point" thresholding. Instead of selecting from the CMM output array of summed values those bits representing column values that are equal to or greater than a predetermined numerical value ('2' in the above simple example), the k highest-value bits are selected, whatever those numerical values might be. In practice, a threshold is determined at the time of recall for each CMM that returns k or more bits set to one, to implement k-point thresholding. In practice, we usually find that k=N.

An improvement to assist finding an exact match of an input query is as follows. When binary codes representing tensored tuples are OR-ed (as in the above example for SPOTTER—FIG. 2), the system can "lose" bits, for example:

| | |
|---|---|
| Code 1: | 0110000 |
| Code 2: | 0100010 |
| Code 1 OR Code 2: | 0110010 |

Note that the resultant OR-ed code (SIB, superimposed binding) has only 3 bits set, whereas the original codes have a total between them of 4 bits set. This can causes problems in the threshold stage of the CMM recall, in that too many possible matches may be listed.

The summed separator values that are output as an array in a subsequent recall or search process are a result of the above SIB being used to teach the CMM. The summed values are thresholded to obtain the separators of the possible matching data. For an exact match of the input postal address to a stored postal address, the threshold can be set to the number of bits set in the input. But because of the "loss" of bits shown above, the system will give a lower threshold than "should" be given. In this case 3 instead of 4. This results in many more false hits from the memory.

A solution to this is to "multiple activate" in the teaching stage bits which have two bits (or more) OR-ed on top of each other—i.e. those lines are counted more than once in the CMM teaching or access stage. In the recall or search stage, the threshold count then includes these multiple counts in the number of bits set in the input.

A number of further refinements can be incorporated into embodiments of the invention.

Features may be incorporated into embodiments of the invention, to deal with skewed data. By skewed data is meant data in which certain items recur with a very high frequency, as compared to other items which occur very rarely. Storage of items of data with a high frequency of recurrence can cause saturation of the CMM. This will be explained in more detail below.

As mentioned above, we have found that a particularly suitable technique for converting textual addresses into binary patterns for use with the CMM, was 3-tensoring or 'tripling'—that is, taking three characters of the input at a time, performing the tensoring operation for the binary tokens for each character, and converting the resulting 3-dimensional binary tensor product back into a 1-dimensional binary pattern. Other options are, for example, 2-tensoring (as described above) or 4-tensoring. However, it was found that with 2-tensoring, there were simply not enough combinations of characters to provide a large enough input to the CMM to avoid localised saturation. 4-tensoring would allow an even larger input to be generated, but then starts to suffer from intolerance to spelling mistakes, which is especially pronounced for smaller words which might be represented by only one or two quads. Tripling provides a reasonable compromise.

It was found that 37 individual characters could represent the textual addresses of the address data file. These were the 26 alphabetic characters, the 10 digits and the space. Thus, the binary tokens chosen were 37-bit binary patterns, each with 1 bit set, to give the maximum sparsity of code. After tensoring, each triple would be represented by a binary pattern 50653 bits wide (37*37*37) with only 1 bit set. Thus each triple can be represented by a single number indicating the position within the 50653-bit wide binary pattern of the set bit. For example, the unique triple 'ROA' has the unique triple number of 39268, meaning that the binary pattern has bit 39268 set. The input to the CMM is thus the activation of one CMM line for each triple in an address.

It was found that, for the address data of the address data file, the inputs to the CMM would be very badly skewed. The implications of skewed data are that particular lines of the CMM will be activated far more times than the average over all the CMM input lines. This means that some lines are used far more often than others. As data is only stored in the CMM on activated lines, this means that some lines are having to store far more data than others, rather than the data being spread evenly over the whole CMM. This can lead to saturation of particular lines of the CMM (the ones which are activated far more often than others), and means that they not only fail to store more data, but also that they cannot reliably recall data already stored there.

One possible solution to this problem is simply to expand the CMM horizontally, making each line longer and longer, until there is sufficient capacity in each line to hold all of the information that will be stored there. Obviously, as the CMM has to be rectangular, this means some lines will be far longer than necessary, in order to accommodate the frequently used lines. If the CMM is expanded so as to prevent saturation of the most commonly used input line, the majority of the CMM will be empty.

An analysis of the address data file shows that the most commonly used input triple occurs nearly 1.4 million times, while 91% of the input triples are used less than 10,000 times. This variation in the occurrence of the input triples means that some lines of the CMM are activated far more often than others, and leads to localised saturation of these lines.

One solution to this problem is to split the address data file into a number of smaller files according to some criteria and put each small file in its own smaller CMM.

As well as the input data from the address data file being far from uniformly distributed, another variation from the ideal profile of the CMM inputs is that the number of bits set in each input is not consistent from one address to another. This is because the addresses can be of varying length, and in fact vary from 6 triples to 319 triples. In order to reduce this variation, it was decided that a good method for subdividing the address data file would be based on the address length. This means that for a particular file, and therefore a particular CMM, the number of input lines active would be more uniform. This process is referred to as 'banding'. The total number of different address lengths is 313 (319-6), and by dividing this by the number of CMMs that it was planned to use, we arrive at a set of bands into which each address can be placed based on its length. For example, if we decide to use 3 CMMs, we get $313/3 \cong 104$. Therefore the bands will be 6-110, 111-215 and 216-319 triples. An address is placed in one of these bands according to how many triples it contains.

In the limit, we could decide to use 313 CMMs, which would mean that each separate address length would have its own CMM. However, analysis shows that, even now, the worst case (which happens with addresses of length 12 triples) requires a threshold of 12860. This means that the separator would have to be 25720 bits wide, and one address would still have only a single triple stored in the CMM. Successful recall would rely upon that triple being included in the query.

A better method for allocating multiple CMMs to the problem was required. Instead of trying to split the file up into well defined blocks, it was noted that a more efficient method would be to add addresses to the CMM until a particular line became too saturated to take new data. Address data is then allocated to the CMMs in the following manner.

1. Startwith one CMM.
2. Determine whether the first address to be stored would access any lines of the first CMM which are already saturated.
3. If none of the accessed lines is saturated, store the address in the first CMM and continue from Step 5.
4. If at least one of the lines is saturated, store the address in a new, empty CMM.
5. Read the next address to be stored and determine whether it would access any lines of the first CMM which are already saturated.
6. If none of the accessed lines is saturated, store the address in the first CMM and continue from Step 5.
7. If at least one of the lines is saturated in the first CMM, continue checking all the other CMMs to find one where none of the accessed lines is saturated.
8. If a CMM is found, for which none of the accessed lines is saturated, store the address at this CMM and continue from Step 5.
9. If no CMM is found, for which none of the accessed lines is saturated, store the address in a new, empty CMM, and continue from Step 5.

This process will ensure that no particular CMM line exceeds a chosen level of saturation, and that each address is stored in the first available CMM without exceeding this saturation level.

The problem of skewed data may not be overcome completely by simply splitting up the file, and it was desirable not to exclude data simply because it was too common. Taking these two requirements resulted in very wide CMMs where only a few lines were very heavily used. While this approach should in theory perform well, its drawback is the amount of memory required to hold the CMM. Given the skewedness of the input distribution, it is clear that the majority of the CMM would be filled with zeros. This means that the majority of the CMM is not actually holding any information and it follows from this that it ought to be possible to compress the CMM, reducing the amount of space wasted while not affecting the parts of the CMM which actually hold useful data. A technique for achieving this was developed—by dynamically altering the implementation of the CMM on a per-line basis, according to how much data the line has to store.

Figure 6A:
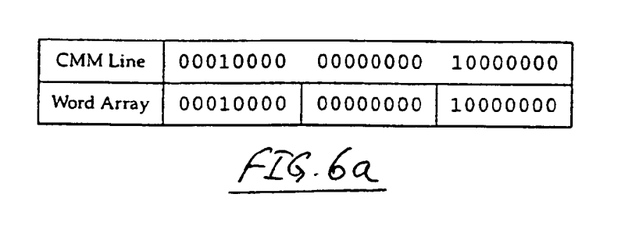
FIG. 6a shows a conventional implementation of a CMM line.
Figure 6B:
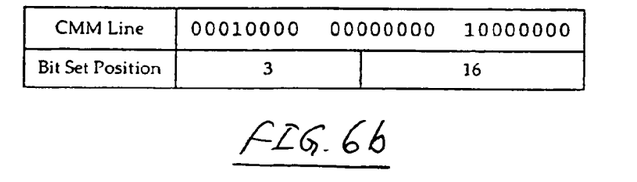
FIG. 6b shows an alternative implementation of a CMM line.

The conventional method for implementing a CMM line has been to hold the binary pattern for that line as an array of words, as shown in FIG. 6a. This shows a single 24 bit CMM line which has a single 2-bit-set separator in it, and its representation as an array of three 8-bit words. However, an alternative representation is shown in FIG. 6b. This new method of implementing a CMM line is to store a list of the positions of the bits set to 1. These are the only significant parts of the CMM, and this removes the need to actually store all of the zeros as well. In this example, the CMM is 24 bits wide. This means the highest bit position is 23 (starting from 0), and the number 23 can be represented in 5 binary bits. So in this case, a 24-bit CMM line with a single 2-bit separator stored in it can be represented using only 10 bits—the two 5-bit numbers indicating the positions of the set bits in the CMM line.

Figure 7:
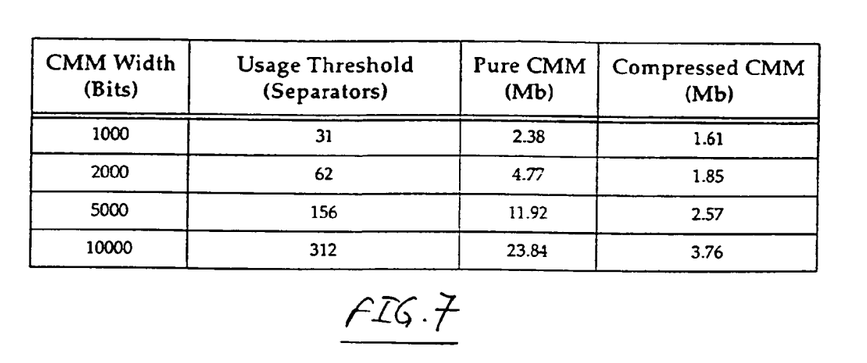
FIG. 7 shows line usage thresholds for compressed CMMs.

The implications are not immediately obvious for such a small CMM line, but the table in FIG. 7 shows how many 2-bit-set separators can be stored using this new method for larger CMMs. This table assumes a machine word size of 16 bits. If the number of separators to be stored in a line exceeds the usage threshold, then it becomes more memory-efficient to store a real binary representation of the CMM line. The 3rd and 4th columns show the total memory requirement for a 20000 input line CMM, where 10% of the lines are used 400 times, and the other 90% of the lines are used only 20 times each.

There are a few points which should be noted about the figures presented in FIG. 7.

1. The method of storing the CMM line, whether conventional binary or compressed, makes no difference to the operation of the CMM as a whole. It is quite possible to mix ordinary and compressed lines within one CMM. The only difference is that a conventional line must be scanned for set bits during the recall phase in order to accumulate the summed values, whereas a compressed line already has the bits positions implicitly stored.
2. The values of 10%, 90%, and their corresponding usage counts of 400 and 20 were chosen to illustrate the point that when most of the inputs fall below the usage threshold value, a considerable saving in memory can be obtained, especially as the CMM is made larger.
3. The amount of memory required by the compressed CMM lines in this example is constant, no matter what the width of the CMM. This is the main reason that the 10000-bit wide CMM shows such a large memory saving. In effect, only 10% of the CMM has grown to 10000 bits wide, while the other 90% is still using the same amount of memory as it was for a 1000 bit wide CMM.
4. In a real application, the number of times each input line is activated is unlikely to fall into 2 groups as in the example here. In practice, the usage count for each input line can be seen to climb very slowly until it suddenly grows very rapidly indeed. The CMM width should be chosen to be as large as is practical, so that most of the lines will be stored compressed, and only the very commonly used lines will be stored as binary CMM lines.

Figure 8:
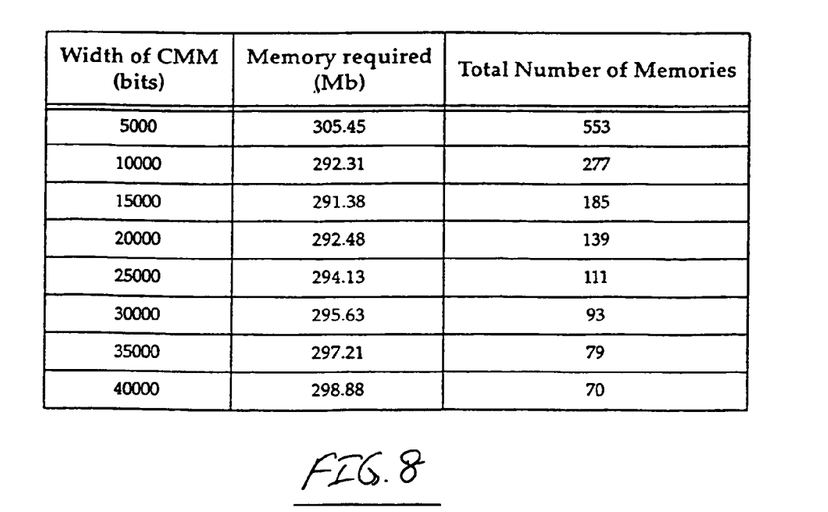
FIG. 8 shows memory requirement for various sizes of CMM.

By running an analysis of the address database using these new techniques, the data shown in FIG. 8 was obtained. It shows the total amount of memory required to store the full address database using various widths of CMM.

Figure 9:
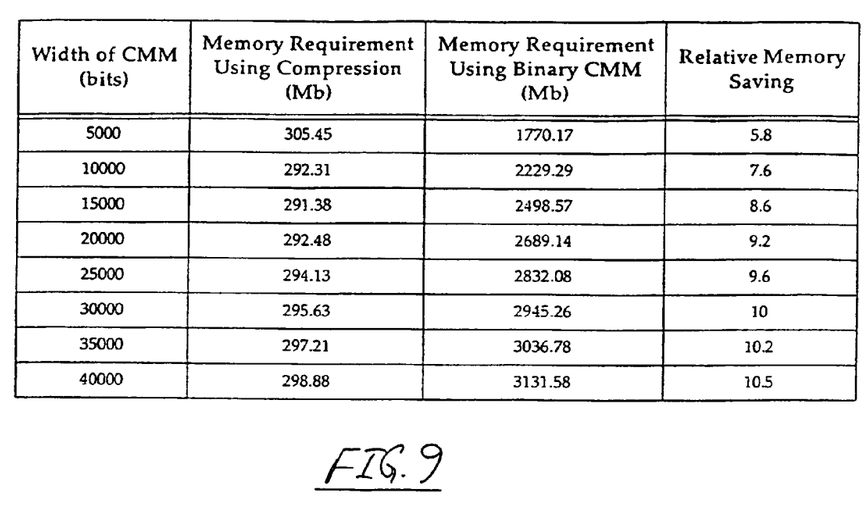
FIG. 9 shows relative memory savings for various sized CMMs, using compression.

It can be seen from this table that there is a minimum memory requirement somewhere around the 15000 bit size. In fact, going down to 1000 bit intervals, this point is reached at 14000 bits. What this implies is that the advantages of storing compressed CMM lines is maximised—using any wider CMMs results in the extra overhead of holding very wide real binary lines outweighing the savings which can be made using compressed lines. From this value, we can work out how many separators can be stored in a CMM line before it becomes more economical to store them as real binary CMM lines. 14000 bits gives us 1750 bytes of storage. Each bit position in a separator would require 2 bytes, and each separator has 2 bits set. So dividing this by 4 gives us a value of 437 separators. This means that if a particular line of a particular CMM is used 437 or fewer times, it would be more memory efficient to store it as a compressed line. Further analysis shows that for this particular application, 198 memories are required, ranging in size from 12264×14000 bits down to 3585×14000 bits. On average, each memory has 3.7% real binary lines and 96.3% compressed lines. Of these, nearly 20% of the inputs to each memory are used only once during training. The total memory requirement for this configuration is 291.2 Mb. As a comparison, if each CMM line was stored as a "real" binary line, the total memory requirement would be 2.4 Gb. The compression technique has therefore achieved over an eight-fold memory saving in this particular case. As was implied earlier, the wider the CMM, the greater the relative memory saving that can be obtained using compressed CMM lines. The table in FIG. 9 shows the relative savings for the CMMs detailed previously in FIG. 8.

Further pre-processing of the text may be carried out, to help in reducing the incidence of saturation of CMM lines. In the example of the address data file, this may be achieved by removing hyphen and number characters from an input data string, except for those characters forming part of the postcode. That is, the string is processed to remove unwanted characters and generate a set of tokens (i.e. sub-strings deemed to be valid inputs for the purpose of generating CMM input codes). The potential loss of information can then be made up for by more accurate matching which takes place in a Back-Check function.

An example of such a tokenisation process is as follows:

String to tokenise:

"68 45636 1-23 31-49 SANDRINGHAM ROAD SOUTHAMPTON SO18 1JL"

| | |
|---|---|
| Found 9 tokens | |
| Token 0: "68" | Remove unacceptable string from input |
| Token 1: "45636" | Remove unacceptable string from input |
| Token 2: "1–23" | Remove unacceptable string from input |
| Token 3: "31–49" | Remove unacceptable string from input |
| Token 4: "SANDRINGHAM" | Accepted |
| Token 5: "ROAD" | Accepted |
| Token 6: "SOUTHAMPTON" | Accepted |
| Token 7: "SO18" | Accepted |
| Token 8: "1JL" | Accepted |

As outlined above, a unique binary code is then assigned to each unique input character. It is useful to provide access to the mapping between characters and binary codes so that applications can "look-up" the character/string for a given code, and vice-versa. The actual form of the code is determined by three parameters. One parameter specifies the width of the bit field (in bits) for all codes to be used in a particular CMM. A second parameter specifies the number of bits which are to be set to logical '1' in the code, which is normally a small, fixed number. A third parameter may be provided which specifies the minimum permitted Hamming distance between any pair of codes used in a particular CMM. This provides some control over the amount of "overlap" between codes used and helps to minimise spurious outputs during subsequent recall. The codes may then be processed and stored in the CMM, as described above.

Embodiments of the invention may use Middle-Bit-Indexing (MBI) extraction to extract separators from a superimposed separator (conveniently referred to as an SIS) as may be produced as the binary output from the CMM, as described above. An example of an MBI extractor is illustrated in FIG. 10.

Figure 10:
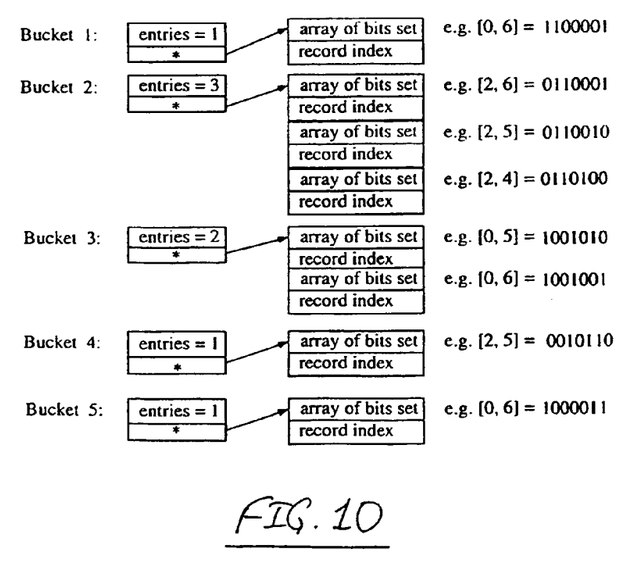
FIG. 10 is an illustration of an MBI ("Middle-Bit-Indexing") extractor.

The MBI extractor illustrated in FIG. 10 is very efficient in maintaining mappings between separators and the records they represent and, most importantly, to process an SIS by extracting any individual separators that are present, and retrieving the corresponding records.

The MBI extractor uses the middle bits of the SIS to determine which buckets of a separator database to access during search. Each separator is stored in a bucket corresponding to the location of the middle bit of the bits that are set (to '1') in that separator.

Basically, the "middle bits" of a separator are used to identify the bucket where that separator would be stored in the separator database if the separator in question existed. The problem is that, during a recall operation, an SIS is obtained which contains a number of possible separator codes, of which some may not exist in the system. (Recall that a separator is only brought into existence if it is created when entering a record into the CMM.) MBI uses an index into the separator database based on the position of the middle bit of existing separator codes, to find the genuine separators in an SIS and hence the records represented by those genuine separators.

FIG. 10 shows the type of data structure used in MBI extractors. Here the buckets are enumerated such that the ordinal number of the bucket corresponds with the position of the middle set bit for those separators stored within that bucket (counting from left to right) in the separator database. Buckets 0 and 6 are not shown, since they are not used in this MBI-based example. This is simply because the separators are seven bits wide and bits 0 and 6 could not be "middle bits".

Consider bucket 5, for example. This bucket has just one entry for the separator 1000011, which has the 5th bit set. If the separator 0010011 existed in this system, it too would be stored in bucket 5. Note that the separator is not stored explicitly in this extractor (that is, as the full binary number such as 1100001), but rather as an array of integers representing the set bit positions in the separator (that is, the corresponding shorter array such as [0,6]). Since the bucket number is the same as the bit position of the middle bit for all separators in a particular bucket, the integer representing the fact that the middle bit is set is omitted from the array of bits set to avoid redundancy.

During a recall operation, the SIS generated from the CMM is inspected to identify each bit position which represents a potential middle bit in a separator. A group of one or more set bits on the extreme left and right are discounted immediately, because they cannot assume a middle position. For example, if the separators are fixed to have always 5 bits set, then the 2 bits on the extreme left and right of the SIS can never be middle bits.

Once the extreme bit positions have been discounted, every other set bit is a potential middle bit and the corresponding buckets must be checked. One implementation of this uses AND separator checking. This uses a bitwise logical AND between each separator stored in each selected bucket and the SIS. If a stored separator is unchanged by the AND operation, the SIS must contain that separator. The number (identifier) of each found separator is added to a list so that the records represented by the separators can be subsequently recovered.

The result of a search using the CMM are sometimes imperfect in the sense that some of the separators appearing in the SIS are spurious and merely a side-effect of the way CMM storage operates. This means that some records may be erroneously indicated as matching the input. A Back-Checker is a device which aims to verify whether each result record is a true possible match with the input or whether it is a spurious result (non-match).

One implementation of a Back-Checker operates by counting the number of words in every result record which match a word in the input query. In addition, the score is modified by including the result of comparing the soundex code of words in the address. A soundex code represents the sound of a word such that similar sounding words are meant to have the same soundex code. Increasing the score for a matching soundex code is intended to improve tolerance to minor spelling errors in the query. The resulting count is used to rank the results according to how well they match the input.

A particular advantage of the illustrated data processors is that a significant amount of data compression takes place in the storage of indexes in a CMM. This is a consequence of using multiple set bits in the separator code (i.e. more than 1 bit is set in each separator code), and the columnwise summation of bits from selected rows. The former means that separator codes may be overlapped during the training phase (i.e. more than one separator code can have the same bit set), and the latter means that any aliasing introduced by this overlapping can be resolved during recall. It may be noted that summation results in a kind of voting system, where selected rows cast a vote for a particular separator/record at the places where a bit is set. This provides a much more selective system than, for example, many previous methods which have (in effect) used a logical AND to combine bits from selected rows. The number of overlapping codes increases with the number of separators stored, and eventually errors may occur during recall in the form of additional records being selected as well as the genuine matches. This is also seen as a feature of the system, where one can trade-off increasingly compressed storage of indexes against a small (but increasing with compression) probability of erroneous records together with the desired records.

Those skilled in the art will readily appreciate that rows and columns of a matrix can readily be interchanged. For example, binary patterns and separators that are illustrated as being entered respectively as rows and columns could equally be entered respectively as columns and rows, provided that all data entry and recall is consistent in the convention chosen.

Although the illustrated embodiments of the invention have been described by way of example as for address matching in the address data file, it is to be appreciated that other embodiments of the invention may be used to store and recall data of any other type.

In this specification, the verb "comprise" has its normal dictionary meaning, to denote non-exclusive inclusion. That is, use of the word "comprise" (or any of its derivatives) to include one feature or more, does not exclude the possibility of also including further features.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data processor comprising:
   (a) a correlation matrix memory arranged to store data;
   (b) input means arranged to receive sets of input data to be stored in the correlation matrix memory;
   (c) a sampler arranged to derive, from each set of input data, a respective set of tuples;
   (d) a coder arranged to code each of the tuples by tensoring;
   (e) a combiner arranged to combine the coded tuples for a respective set of input data;
   (f) a separator generator arranged to generate for each set of input data a respective, associated, unique separator;
   (g) storage means arranged to store the association of each separator with its respective set of input data; and
   (h) addressing means arranged to applying to the correlation matrix memory, for each set of input data, the respective combined coded tuples as a row address and the respective unique separator as a column address, or vice-versa:
   wherein said correlation matrix memory comprises a plurality of sub-correlation matrix memories; said addressing means is arranged to access a first one of said sub-correlation matrix memories and apply the combined coded tuples of a respective set of input data to that sub-correlation matrix memory unless a respective row (or column) of that sub-correlation matrix memory will become saturated by application of those tuples; and in the event of such prospective saturation, access successive ones of the sub-correlation matrix memories until those tuples can by applied to a respective one of the sub-correlation matrix memories without such saturation.

2. A data processor according to claim 1, wherein the combined coded tuples for each set of input data are in the form of a binary coded word; the data processor further comprises a translator arranged to translate each such binary coded word into a translated word comprising index values representing which bits of the binary coded word are set; and said addressing means is arranged to apply the translated word to the correlation matrix memory.

3. A data processor according to claim 1, wherein said separator generator is arranged to generate separators in a random manner.

4. A data processor according to claim 1, wherein said separator generator is arranged to generate separators which are M bits wide and having N bits set, where N>1 or N=1, and where N<M.

5. A data processor according to claim 1, wherein, for each said set of tuples, each tuple comprises three successive elements of a respective set of input data, and each successive tuple is offset by one such element from the preceding tuple.

6. A data processor according to claim 1, wherein said combiner is arranged to combine the coded tuples for a respective set of input data, by superimposition.

7. A data processor according to claim 1, wherein at least some of the rows (or columns) of the correlation matrix memory are represented by binary words, each of which represents the positions of each bit in the respective row (or column) which is set.

8. A data processor according to claim 1, arranged to process sets of input data and query data in the form of postal addresses.

9. A method of processing data, comprising the steps of:
   (a) receiving sets of input data to be stored in a correlation matrix memory;
   (b) deriving, from each set of input data, a respective set of tuples;
   (c) coding each of the tuples;
   (d) combining the coded tuples for a respective set of input data;
   (e) generating for each set of input data a respective, associated, unique separator;
   (f) storing the association of each separator with its respective set of input data;
   (g) applying to the correlation matrix memory, for each set of input data, the respective combined coded tuples as a row address and the respective unique separator as a column address, or vice-versa;
   (h) receiving sets of query data to be matched with sets of input data stored in the correlation matrix memory;

(i) deriving, for each set of query data, a respective set of coded tuples analogous to those derived for the original input data;

(j) applying to the correlation matrix memory, for each set of query data, the respective combined coded tuples as a row (or column) address;

(k) outputting a raw superimposed separator which represents, for a respective set of query data, the number of rows (or columns) having a bit set by the applied combined coded tuples in each column (or row) represented by the raw superimposed separator;

(l) converting the raw superimposed separator into a binary superimposed separator;

(m) extracting one or more individual separator from the binary superimposed separator; and (n) identifying the or each respective original set of input data from association with the or each individual separator extracted from the binary superimposed separator.

10. A method according to claim 9, wherein said sets of input data and query data are in the form of postal addresses.

11. A data processor comprising:

(a) a correlation matrix memory arranged to store data;

(b) input means arranged to receive sets of input data to be stored in the correlation matrix memory;

(c) a sampler arranged to derive, from each set of input data, a respective set of tuples;

(d) a coder arranged to code each of the tuples by tensoring;

(e) a combiner arranged to combine the coded tuples for a respective set of input data;

(f) a separator generator arranged to generate for each set of input data a respective, associated, unique separator;

(g) storage means arranged to store the association of each separator with its respective set of input data; and (h) addressing means arranged to applying to the correlation matrix memory, for each set of input data, the respective combined coded tuples as a row address and the respective unique separator as a column address, or vice-versa;

wherein the data processor is arranged to receive sets of query data to be matched with sets of input data stored in the correlation matrix memory, and to derive, for each set of query data, a respective set of coded tuples analogous to those derived for the original input data, and to apply to the correlation matrix memory, for each set of query data, the respective combined coded tuples as a row (or column) address: the data processor further comprising:

(i) output means for outputting a raw superimposed separator which represents, for a respective set of query data, the number of rows (or columns) having a bit set by the applied combined coded tuples in each column (or row) represented by the raw superimposed separator;

(j) threshold means arranged to convert the raw superimposed separator into a binary superimposed separator; and (k) an extractor arranged to extract individual separators from the binary superimposed separator.

12. A data processor according to claim 11, wherein said thresholding means sets an absolute threshold value, and provides said binary superimposed separator as a word in which bits represent respective columns (or rows) of the correlation matrix memory, and each of those bits is set if the number of rows (or columns) having a bit set by the applied combined coded tuples in the respective column (or row) equals or is greater than said absolute threshold value.

13. A data processor according to claim 11, wherein said thresholding means determines a value k, and provides said binary superimposed separator as a word in which bits represent respective columns (or rows) of the correlation matrix memory, and are set for the k respective columns (or rows) having the highest number of rows (or columns) which have a bit set by the applied combined coded tuples in the correlation matrix memory.

14. A data processor according to claim 11, further comprising back-checking means arranged to compare sets of recalled data, identified by respective separators extracted by said extractor, with original query data, in order to identify the set or sets of recalled data which matches best the original query data.

15. A data processor according to claim 11, arranged to process sets of input data and query data in the form of postal addresses.

* * * * *